United States Patent
Loh et al.

(10) Patent No.: US 9,221,687 B2
(45) Date of Patent: Dec. 29, 2015

(54) PROCESS FOR FORMING EXPANDED HEXAGONAL LAYERED MINERALS AND DERIVATIVES USING ELECTROCHEMICAL CHARGING

(71) Applicants: Kian Ping Loh, Singapore (SG); Junzhong Wang, Singapore (SG); Gordon Chiu, Summit, NJ (US)

(72) Inventors: Kian Ping Loh, Singapore (SG); Junzhong Wang, Singapore (SG); Gordon Chiu, Summit, NJ (US)

(73) Assignee: National University of Singapore, Singapore (SG)

( * ) Notice: Subject to any disclaimer, the term of this patent is extended or adjusted under 35 U.S.C. 154(b) by 350 days.

(21) Appl. No.: 14/009,800

(22) PCT Filed: Nov. 22, 2012

(86) PCT No.: PCT/SG2012/000440
§ 371 (c)(1),
(2) Date: Oct. 4, 2013

(87) PCT Pub. No.: WO2013/089642
PCT Pub. Date: Jun. 20, 2013

(65) Prior Publication Data
US 2014/0027299 A1    Jan. 30, 2014

Related U.S. Application Data

(60) Provisional application No. 61/570,330, filed on Dec. 14, 2011.

(51) Int. Cl.
*C01B 31/04* (2006.01)
*B82Y 40/00* (2011.01)
(Continued)

(52) U.S. Cl.
CPC ............ *C01B 31/0423* (2013.01); *B82Y 30/00* (2013.01); *B82Y 40/00* (2013.01); *C01B 19/007* (2013.01);
(Continued)

(58) Field of Classification Search
CPC    C01B 31/0206; C01B 31/04; C01B 31/0415; C01B 31/0423; C01B 31/0438; C01B 31/0446; C01B 31/0469
See application file for complete search history.

(56) References Cited

U.S. PATENT DOCUMENTS

| | | | |
|---|---|---|---|
| 1,137,373 A | 4/1915 | Aylsworth | |
| 5,554,462 A | * 9/1996 | Flandrois | ............... C01B 31/04 423/445 R |

(Continued)

FOREIGN PATENT DOCUMENTS

WO    WO 2012/120264    9/2012

OTHER PUBLICATIONS

Su et al, "High-Quality Thin Graphene Films from Fast Electrochemical Exfoliation," ACS Nano (2011), vol. 5, No. 3, pp. 2332-2339.*

(Continued)

*Primary Examiner* — Keith Hendricks
*Assistant Examiner* — Salil Jain
(74) *Attorney, Agent, or Firm* — Opticus IP Law PLLC

(57) ABSTRACT

Processes for forming expanded hexagonal layered minerals (HLMs) and derivatives thereof using electrochemical charging are disclosed. The process includes employing HLM rocks (20) as electrodes (100) immersed in an electrolytic slurry (50) that includes an organic solvent, metal ions and expanded HLM (24). The electrolysis introduces organic solvent and ions from the metal salt from the slurry into the interlayer spacings that separate the atomic interlayers of the HLM rock, thereby forming $1^{st}$-stage charged HLM that exfoliates from the HLM rock. The process includes expanding the electrochemically $1^{st}$-stage charged HLM by applying an expanding force.

19 Claims, 6 Drawing Sheets

(51) Int. Cl.
  *C25B 1/00*     (2006.01)
  *C01B 21/064*   (2006.01)
  *C01B 19/00*    (2006.01)
  *C01G 31/02*    (2006.01)
  *C01G 39/06*    (2006.01)
  *C01G 41/00*    (2006.01)
  *B82Y 30/00*    (2011.01)
  *H01M 4/583*    (2010.01)
  *H01M 4/587*    (2010.01)

(52) U.S. Cl.
  CPC ......... *C01B 21/0648* (2013.01); *C01B 31/0415* (2013.01); *C01B 31/0446* (2013.01); *C01B 31/0469* (2013.01); *C01G 31/02* (2013.01); *C01G 39/06* (2013.01); *C01G 41/00* (2013.01); *C25B 1/00* (2013.01); *C01B 31/0438* (2013.01); *C01P 2002/20* (2013.01); *H01M 4/583* (2013.01); *H01M 4/587* (2013.01)

(56) References Cited

U.S. PATENT DOCUMENTS

| | | |
|---|---|---|
| 5,698,088 A | 12/1997 | Kang et al. |
| 2008/0279756 A1 | 11/2008 | Zhamu et al. |
| 2013/0102084 A1* | 4/2013 | Loh ................... B01J 21/185 |
| | | 436/94 |

OTHER PUBLICATIONS

International Search Report and Written Opinion for PCT/SG2012/000440, dated Jan. 23, 2013.

* cited by examiner

PROCESS FOR FORMING EXPANDED HEXAGONAL LAYERED MINERALS AND DERIVATIVES USING ELECTROCHEMICAL CHARGING

CLAIM OF PRIORITY

This Application claims the benefit of priority from International Application Number PCT/SG2012/000440, having an international filing date of Nov. 22, 2012, which is incorporated by referenced herein and which claims priority from U.S. Provisional Patent Application Ser. No. 61/570,330, filed on Dec. 14, 2011, and which application is incorporated by reference herein.

FIELD

The present disclosure relates to processing hexagonal layered minerals and in particular relates to a process for forming expanded hexagonal layered minerals and derivatives thereof using electrochemical charging.

BACKGROUND ART

There exists a class of minerals that are formed from sheets or layers that have an hexagonal crystal structure and that are referred to herein as hexagonal layered minerals. Such minerals include graphite, molybdenum disulfide, tungsten disulfide (diselenide), hexagonal boron nitride, vanadium pentoxide, vanadium X oxides (e.g., vanadium selenium oxide), and like minerals.

Graphite is perhaps the best known of the hexagonal layered minerals because it exhibits basal cleavage, good electrical and heat conductivity, refractoriness and resistance to acids. It is an important component in many technologies, such as leading-edge alternative energy solutions, including batteries and hydrogen fuel cells. It is also used in producing electrodes and brushes for electric motors. Graphite is also a key component in metallurgic and refractory materials, and is used as a release agent in molds, dies and form linings when making metal parts and castings.

Graphite is obtained by mining graphite-rich ore (i.e., graphite rock) and milling it down to the consistency of sand to allow the graphite to be removed. The milled material is then put through a series of flotation processes to extract the graphite.

A variant of graphite is expanded graphite, which is graphite that has been treated such that the interlayer distance between the individual crystal planes is expanded beyond the usual van der Waals distances. Expanded graphite has a much higher energy and gas storage capacity than ordinary graphite.

Conventionally, graphite rock has to be milled before it can be processed as expanded graphite. To produce expanded graphite using prior art techniques, the milled graphite flakes are immersed in concentrated acids. All these processes are energy intensive, and the acid intercalation process creates many defects in the graphite, which adversely affect the graphite's electrical conductivity. Working with acids is also generally not preferred because they are caustic and difficult to handle.

Graphene is a derivative of graphite and comprises a two dimensional sheet of hexagonally arranged atomic carbon with very attractive physical, optical and mechanical properties, including high charge carrier mobility, record thermal conductivity and stiffness.

Few-layer graphene (FLG), which can be derived from the exfoliation of graphite or graphite oxide, exhibits better dispersion properties and therefore can form more homogeneous blends or composites with other materials than graphite can. It is expected that enhanced performance can be obtained where FLG substitutes for graphite flakes as the key component in coatings, metallurgy or refractories.

What is needed are efficient processes for forming expanded hexagonal layered minerals and their derivatives without the need to perform complex and potentially hazardous processing steps.

SUMMARY

The present disclosure is directed to a process that can transform hexagonal layered minerals into an expanded form with almost 90% yield in a single pass, without the need for any form of pre-treatment such as milling, and without the need to use acids.

An aspect of the disclosure includes a process of forming an expanded hexagonal layered mineral (HLM). The process includes immersing at least a portion of an HLM rock in slurry constituted by a mixture of expanded HLM rock, a metal salt and an organic solvent, wherein the HLM rock has atomic interlayers each having an hexagonal lattice structure, with the atomic interlayers separated by interlayer spacings. The process also includes electrochemically charging the HLM rock by incorporating the HLM rock into at least one electrode and performing electrolysis through the slurry using the at least one electrode, thereby introducing the organic solvent and ions from the metal salt from the slurry into the interlayer spacings of the HLM rock to form $1^{st}$-stage charged HLM that exfoliates from the HLM rock. The process further includes expanding the $1^{st}$-stage charged HLM by applying an expanding force to increase the interlayer spacing between the atomic layers.

Another aspect of the disclosure is a composition of matter useful for performing electrochemical charging of an hexagonal layered mineral (HLM), comprising: HLM rock: 25-65 wt % or 15-20 wt %; HLM flake: 0.1-10 wt % or 0.1-5 wt %; and an electrolyte of 100-200 g/L or 80-160 g/L of $LiClO_4$ (5-10 wt %) in propylene carbonate: 40-80 wt % or 70-80 wt %.

Another aspect of the disclosure is a process of forming expanded graphite from graphite rock having atomic interlayers separated by interlayer spacings. The process includes immersing at least a portion of a graphite rock in slurry constituted by a mixture of expanded graphite, a metal salt and an organic solvent. The method also includes electrochemically charging the graphite rock by incorporating the graphite rock into at least one electrode and performing electrolysis through the slurry using the at least one electrode, thereby introducing the organic solvent and ions from the metal salt from the slurry into the interlayer spacings of the graphite rock to form $1^{st}$-stage charged graphite that exfoliates from the graphite rock. The method further includes expanding the electrochemically $1^{st}$-stage charged graphite by applying an expanding force to increase the interlayer spacings between the atomic layers. The method optionally includes forming the slurry to have the following composition: graphite rock: 25-65 wt % or 15-20 wt %; graphite flake: 0.1-10 or 0.1-5 wt %; and an electrolyte of 100-200 g/L or 80-160 g/L of $LiClO_4$ (5-10 wt %) in propylene carbonate: 40-80 wt % or 70-80 wt %.

The foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure. For example, subject to the constraints of fluid dynamics, electrical power and container volume, the description below is scalable to any physical dimensions.

The claims are incorporated into and constitute part of this specification.

Figure 1:
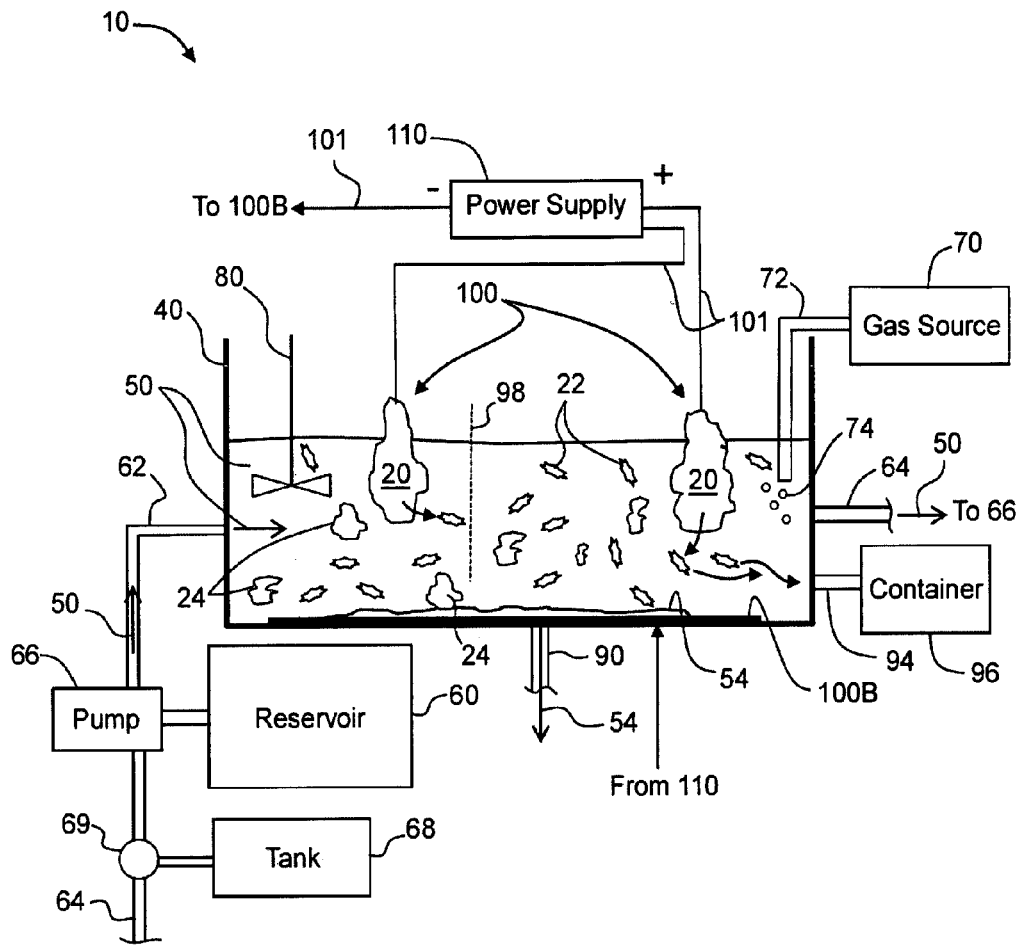
FIG. 1 is a schematic diagram of an example electrochemical charging system configured to perform electrochemical charging of one or more HLM rocks in forming expanded HLM and its derivatives.

The various elements depicted in the drawings are merely representational and are not necessarily drawn to scale. Certain sections thereof may be exaggerated, while others may be minimized. The drawings are intended to illustrate an example embodiment of the disclosure that can be understood and appropriately carried out by those of ordinary skill in the art.

DETAILED DESCRIPTION

The present disclosure relates to a process of forming expanded hexagonal layered minerals (HLMs) and their derivatives using electrochemical charging. The description below is based in part on graphite as an examplary HLM whose derivatives include FLG flakes and graphene that have desirable physical properties for a variety of applications. The processes described hereinbelow apply generally to HLMs, and the portions of the description based on graphite as an exemplary HLM are merely by way of non-limiting illustration.

The following definitions apply to the description set forth herein.

Hexagonal layered mineral (HLM): a mineral having a crystal structure defined by layers ("atomic layers") or sheets that have a six-sided (hexagonal) lattice structure. Example HLMs include graphite, molybdenum disulfide, tungsten disulfide (diselenide), hexagonal boron nitride, vanadium pentoxide, vanadium X oxides (e.g., vanadium selenium oxide), and like minerals.

HLM rock: Hexagonal layered mineral rock.

Graphite: an example HLM that is a crystalline form of carbon wherein the carbon atoms are bonded in layers (atomic layers) having a six-sided (hexagonal) lattice structure.

Graphite rock: a natural graphite mineral that is directly mined, without any form of purification, and that is an example of an HLM rock.

Slurry: HLM flakes, generated from milled or crushed HLM, as well as derivatives of HLM, mixed with organic solvent and salt to form a viscous liquid with good electrical conductivity.

$1^{st}$-stage charged HLM: HLM flakes that have been electrochemically charged in the process described below, before expansion. The HLM flakes here are said to have undergone $1^{st}$-stage expansion.

Expanded HLM: HLM that has been treated such that the interlayer spacings between the atomic layers in the crystal lattice that are weakly bonded have been expanded beyond the usual van der Waals distances in the crystal.

Graphene: A single sheet (atomic layer) of $sp^2$ bonded atomic carbon.

Few-layer graphene (FLG): Several layers of graphene stacked together, either commensurately (following Bernal AB stacking sequence) or incommensurately.

FL-HLM: few-layered hexagonal layered mineral, of which FLG is one example.

Electrochemical charging: A process whereby a voltage is applied to a material acting as either an electrode or an electrolyte, and whereby electric current is passed through the material, and ionic conduction occurs in the electrolyte. In the case where the material is an HLM such as graphite and the electrolyte includes organic compounds, the charging process drives ions and organic compounds originating in the electrolyte into the interlayer spacings between the atomic interlayers of the HLM.

Electrochemical Charging System

FIG. 1 is a schematic diagram of an example electrochemical charging system ("system") 10 configured to perform the electrochemical charging processes of one or more HLM rocks 20 according to the disclosure. The system 10 includes a container 40 that contains an electrolytic HLM-based slurry ("slurry") 50. In an example, slurry 50 is initially contained in a reservoir 60 and is inputted into container 40 via an input pipe 62 and removed from container 40 via an output pipe 64 via the operation of a circulating pump 66. In an example, slurry 50 removed from container 40 via output pipe 64 is directed to a storage tank 68 by a valve 69.

An example slurry 50 contains small pieces of HLM (e.g., milled HLM), derivatives of HLM, expanded HLM or combinations thereof mixed with an organic solvent and a salt. For example, when the HLM rocks 20 are in the form of graphite, slurry 50 contains small pieces of graphite (milled), derivatives of graphite, expanded graphite or combinations thereof mixed with an organic solvent and a salt. An example solvent includes a combination of propylene carbonate and lithium perchlorate, ethylene carbonate, ionic liquids, and phosphonium-based perchlorate salts/ionic liquids. The salts can be based on a variety of ions, such as potassium, lithium, sodium, iron and the like. The slurry 50 is constituted as an electrolytic medium to ensure continuous charging during the electrochemical exfoliation process by providing a low-resistance path between the electrodes, thereby sustaining a high charging current during electrolysis.

In an example, the viscosity of slurry 50 is controlled during the electrochemical charging process by adding expanded HLM 24 to the slurry. In an example, the viscosity of slurry 50 ranges from 0.05 Pa·S to 50 Pa·S.

An example slurry 50 has the following composition: HLM rock: 25-60 wt % or 15-20 wt %; graphite flake: 0.1-10 or 0.1-5 wt %; and an electrolyte of 100-200 g/L or 80 g/L-160 g/L of $LiClO_4$ (5-10 wt %) in propylene carbonate: 40-80 wt % or 70-80 wt %.

The system 10 includes an inert gas source 70 and a pipe 72 having an end that is immersed in slurry 50. An example gas for inert gas source 70 is $N_2$ or Ar. The inert gas source 70 serves to provide gas bubbles 74 into slurry 50 to provide one mechanism for slurry agitation.

The system 10 may also include a mechanical agitator 80 that is immersed in slurry 50 and that serves to agitate (e.g., stir, mix, churn, etc.) the slurry. Other agitation mechanisms can be used to agitate slurry 50, such as acoustic magnetic spin bars, etc., and the mechanical and gaseous agitation mechanisms are shown by way of example.

In an example, one or more porous dividers 98 are employed to define different regions or cells within container 40.

The system 10 also has a first output pipe 90 that serves to output residue 54 that collects on the bottom of container 40 and a second output pipe 94 that serves to remove graphite rock flakes from slurry 50, as described in greater detail below.

The system 10 also includes two or more electrodes 100, one of which is shown by way of example as being disposed on the bottom of container 40 and is referred to as a bottom electrode 100B. At least one other electrode 100 includes HLM rock 20 and such electrodes are referred to herein as "rock electrodes." The electrodes 100 are also connected to a power supply 110 by a wire 101. The power supply 110 provides an electrical potential between electrodes 100. In an example, power supply 110 is configured to provide an alternating electrical potential so that electrodes 100 switch between being anodes and cathodes. The power supply 110 may also provide a direct current. The rock electrodes 100 can be either anodes or cathodes, or can alternate between being anodes and cathodes by varying the electrical potential and thereby their polarity.

Figure 2:
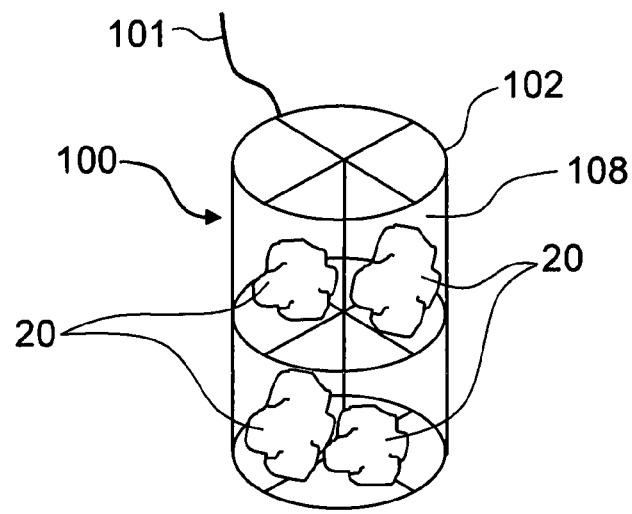
FIG. 2 is a schematic diagram that illustrates an example configuration of an HLM rock electrode in the form of a metal cage that defines an interior configured to contain one or more HLM rocks.
Figure 3:
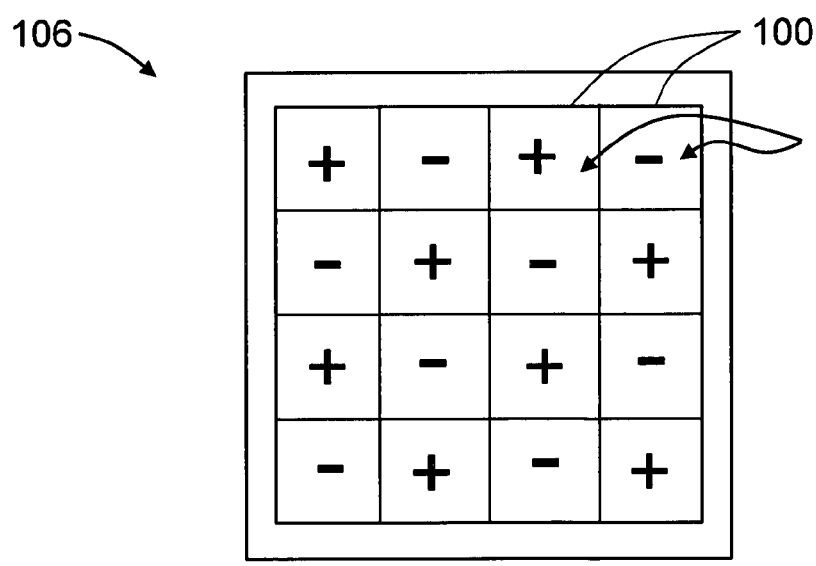
FIG. 3 is a top-down view of an example electrode array that defines a plurality of electrodes, where the electrode polarity varies in a checkerboard fashion.

The rock electrodes 100 can have a variety of different configurations, each of which includes at least one HLM rock 20. FIG. 1 shows a simple configuration where two HLM rocks 20 are each directly electrically connected to power supply 110 via wires 101 and so serve directly as two rock electrodes 100. FIG. 2 is a schematic diagram that illustrates an example configuration wherein rock electrode 100 comprises a metal cage 102 that defines an interior 108 configured to contain one or more HLM rocks 20. The metal cage 102 is electrically connected to power supply 110 via wire 101. FIG. 3 is a top-down view of an example electrode array 106 that defines a plurality of electrodes 100 where the polarity of the electrodes varies in a checkerboard fashion. Each electrode 100 in electrode array 106 defines a corresponding array of interiors 108, each configured to contain one or more HLM rocks 20.

Figure 4:
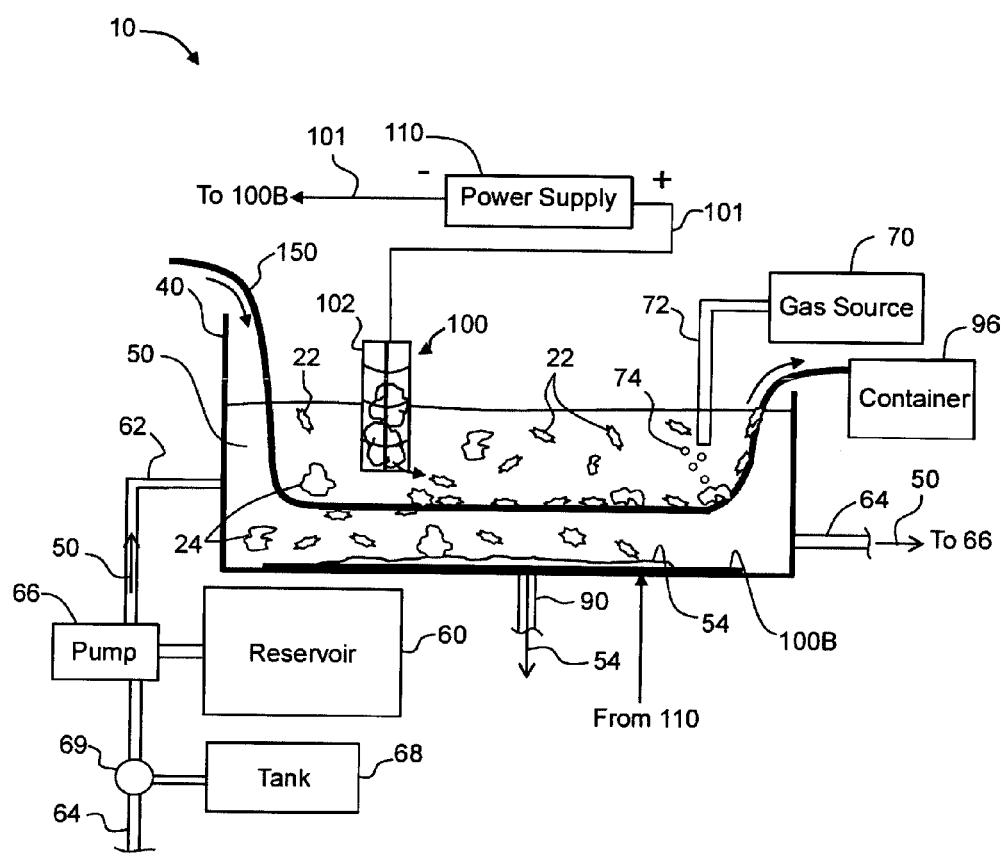
FIG. 4 is a schematic diagram of an example electrochemical charging system that is similar to that of FIG. 1 and that illustrates an embodiment that utilizes a conveyor to convey expanded HLM to a container.

FIG. 4 is a schematic diagram of system 10 that is similar to that shown in FIG. 1 and that includes a conveyor 150. The conveyor 150 is configured such that a portion of it travels through slurry 50. The conveyor 150 may be formed from a belt or chain and is configured to pick up and convey to a storage container 96 HLM flakes 22 that have exfoliated from HLM rock 20, as described below.

Electrochemical Charging to Form $1^{st}$-Stage HLM

A first main step in the process of forming expanded HLM includes electrochemically charging the HLM to form $1^{st}$-stage charged HLM. With reference to FIG. 1, an aspect of the process includes electrochemically charging slurry 50. In an example, slurry 50 enters container 40 via input pipe 62 and flows out of the container via output pipe 64 owing to the action of circulating pump 66.

To electrochemically charge slurry 50, rock electrodes 100 are inserted into the slurry, as shown in FIG. 1. In an example, electrodes 100 (including bottom electrode 100B) are either at a positive voltage (negative ions intercalated, e.g., $ClO_4^-$) or a negative voltage (positive ions intercalated, e.g., $Li_+$), so that a good electrical field permeates slurry 50.

The electrochemical charging process is now described from here on in using graphite as an example HLM.

To electrochemically charge graphite rock 20, rock electrodes 100 are used to create an electrical field with the graphite rock. In an example, the charging voltage provided by power supply 110 to electrodes 100 is in the range of from about 10 V to 20 V DC with a current of between about 0.2 A and 2 A. As discussed above, an AC voltage can also be provided. In an example, the agitation of slurry 50 as provided by mechanical agitator 80 and by the gaseous agitation from gas bubbles 74 from gas pipe 72 assists with the exfoliation of graphite flakes 22 during the electrochemical charging process. In an example, the charging voltage and current from power supply 110 is monitored so that the process can be operated in either a galvanostatic or a potentiometric mode.

When graphite rock 20 is electrochemically charged, it yields graphite flakes 22, which enter and become part of slurry 50. In an example, expanded graphite 24 is added to slurry 50 at appropriate times to maintain or alter (e.g., improve) the slurry's viscosity and conductivity. This also allows the charging current from power supply 110 to be either maintained or altered as the charging current will decrease if the resistance of slurry 50 increases.

The above-described electrochemical charging process causes slurry 50 to contain $1^{st}$-stage charged graphite flakes 22. A portion of slurry 50 is drawn from container 40 via pipe 94 to storage container 96 or conveyed thereto by conveyor 150. With reference to FIG. 4, this process is carried out by conveyor 150. The slurry 50 delivered to storage container 96 is decanted to recover $1^{st}$-stage charged graphite flakes 22 as well as some unreacted materials (e.g., uncharged graphite, expanded graphite, etc.).

Thermal Expansion of $1^{st}$-Stage Charged HLM

A second main step in the process includes the thermal expansion of the $1^{st}$-stage charged HLM to form expanded HLM 24 by applying an expanding force. The expanding force can include at least one of heat, sonication and pressure.

This second step includes removing the solvent from the decanted slurry 50 to substantially remove the solvent. One process of removing the solvent includes directing jets of inert gas such as nitrogen at the decanted slurry 50. The resulting material is rinsed in a container with deionized water (e.g., 3 times) to remove any remaining solvent while allowing any solids to settle to the bottom of the container, leaving the $1^{st}$-stage charged HLM.

Next, the water is removed (e.g., suction dried or gravity dried), and the container holding the $1^{st}$-stage charged HLM is subjected to the aforementioned expanding force. In one example, the expanding force is heat wherein the $1^{st}$-stage charged HLM is heat treated, e.g., on a heating plate heated to a temperature in the range from about 200° C. to 300° C. in open air. This causes the $1^{st}$-stage charged HLM to expand (i.e., the atomic interlayers to start to separate) to form expanded HLM 24. This expansion process typically takes less than 5 minutes.

Next, water is added to the expanded HLM 24 to allow hydraulic classification, wherein the expanded HLM floats to the top surface of the water and is removed therefrom, e.g., skimmed off via a paddle or raking process. Impurities sink and settle out.

The electrochemical charging step and the expansion step can be repeated for multiple cycles on the processed material to improve the exfoliation yield, dispersion and porosity of the expanded HLM 24. As mentioned above, a single pass through the process can provide a 90% yield. Repeating the process on processed material can improve this yield of few-layer graphene well beyond 90%.

Forming Few-Layer Graphene (FLG) Nanosheets

Figure 5:
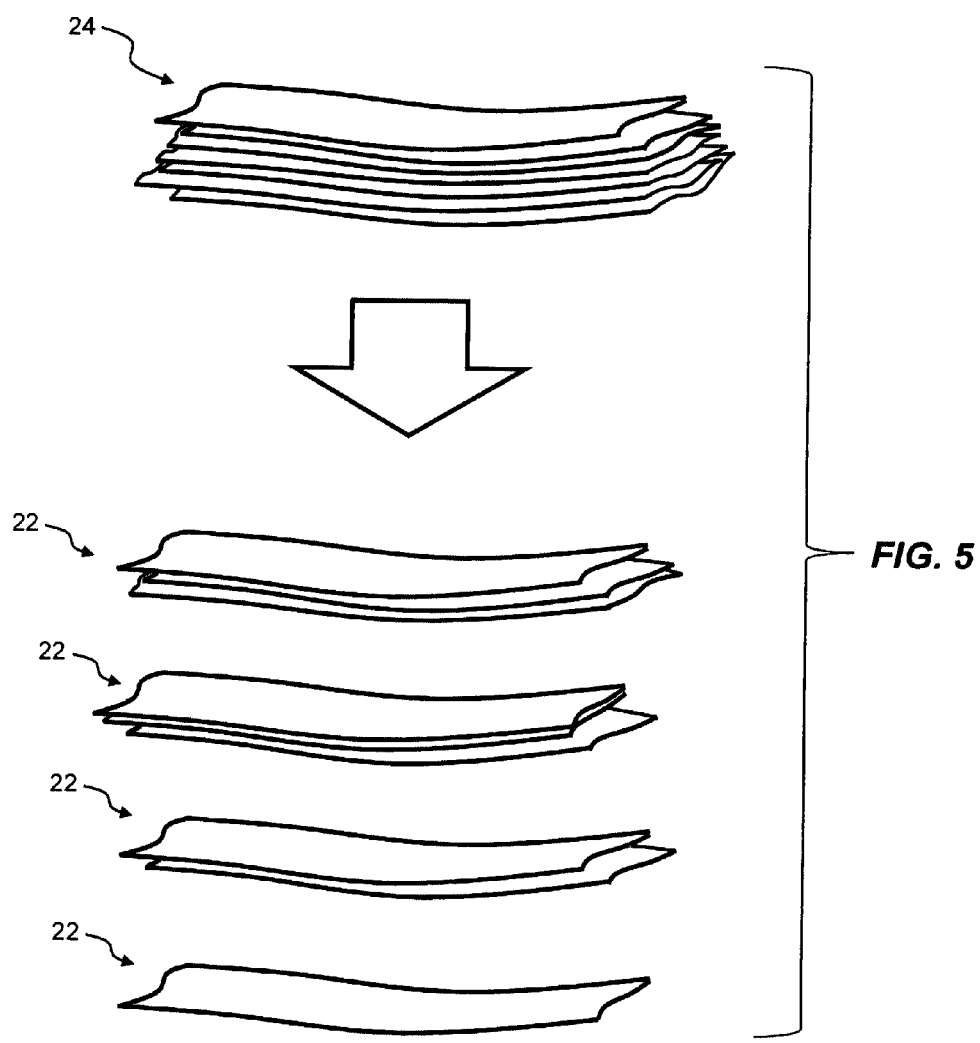
FIG. 5 is a schematic diagram that illustrates how expanded graphite forms FLG nanosheets.

A third main step in the process includes processing the expanded HLM 24 to form HLM nanosheets or flakes 22, as schematically illustrated in FIG. 5. The expanded graphite is sonicated or/and milled in a liquid medium to obtain dispersible FLG 22. The liquid medium can be a hydrophobic or a hydrophilic solvent, or a mixture of both with a surfactant such as N,N-dimethylformamide, propylene carbonate, N-methyl-2-pyrrolidone (NMP), dimethyl sulfoxide (DMSO), dimethylformamide (DMF) and the like. Water or water with sodium dodecyl sulfate (SDS) can also be used as the liquid medium. Sonication can be applied using power sonication, bath sonication or fluidized sonication. Planetary ball milling with colloidal milling can be applied to obtain the dispersible FLG. In an example, the milling process is applied first, followed by sonication.

Experimental Measurements

Figure 6A:
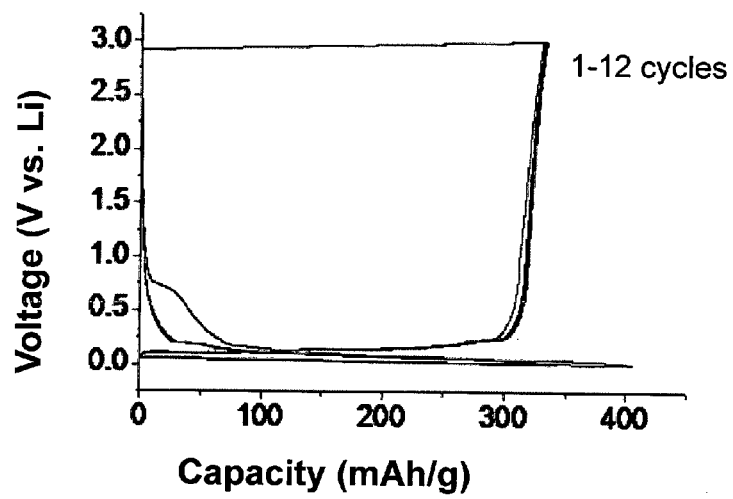
FIGS. 6A through 6D are various plots of experimental data taken on samples of expanded graphite and FLG.

An important verification of the quality of the exfoliated graphene is comparing its lithium capacity in lithium ion battery with that of commercial expanded graphite. FIG. 6A shows the voltage (y-axis) versus reversible lithium capacity (x-axis) plot where the exfoliated graphene is used as the anode. The anode was fabricated with the exfoliated graphene and binder (Kynar 2801) in the weight ratio of 80:20 using N-methyl pyrrolidinone (NMP) as the solvent for the binder. Etched Cu-foil (thickness, 15 μm, China) was used as the current collector. A solution of 1M $LiPF_6$ in ethylene carbonate (EC)+dimethyl carbonate (DMC) (1:1 V/V) (Merck) was used as the electrolyte, with a Watman paper membrane serving as a separator. Lithium metal foil (Kyokuto metal Co., Japan) was used as the counter and reference electrode. Coin-type of size CR2016 (20 mm diameter, and 1.6 mm thick) were fabricated in an Ar-gas filled glove box. Cyclic voltammetry and charge-discharge cycling were carried out at ambient temperature (RT=24° C.) using a Bitrode multiple battery tester (Model SCN, Bitrode, USA) and a Mac-pile II system (Bio-logic, France), respectively. To ensure percolation of the electrolyte, the cells were aged for 12 hours before being measured.

Figure 6B:
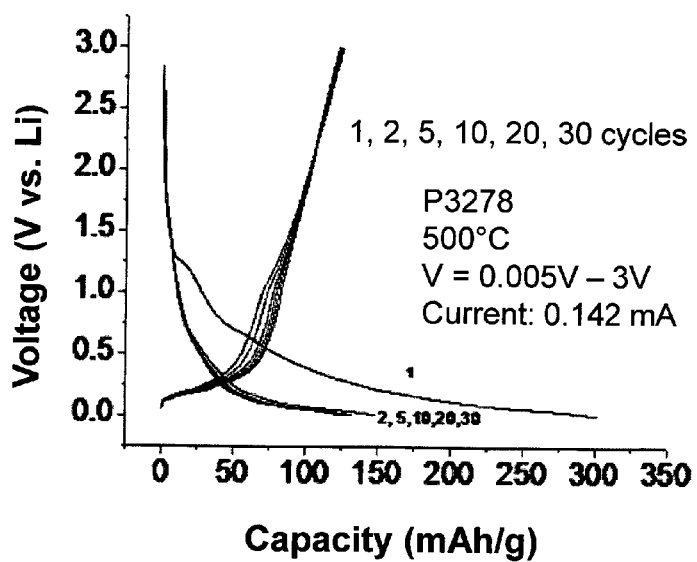

The results show that exfoliated graphene produced from the process described here (FIG. 6A shows a much higher reversible capacity of 340 mAh/g than the commercial expanded graphite sample shown in the similar plot of FIG. 6B, which has a reversible capacity of only 120 mAh/g). The different curves are for different cycle numbers (1-12 in FIG. 6A and 1, 2, 5, 10, 20 and 30 in FIG. 6B).

Figure 6C:
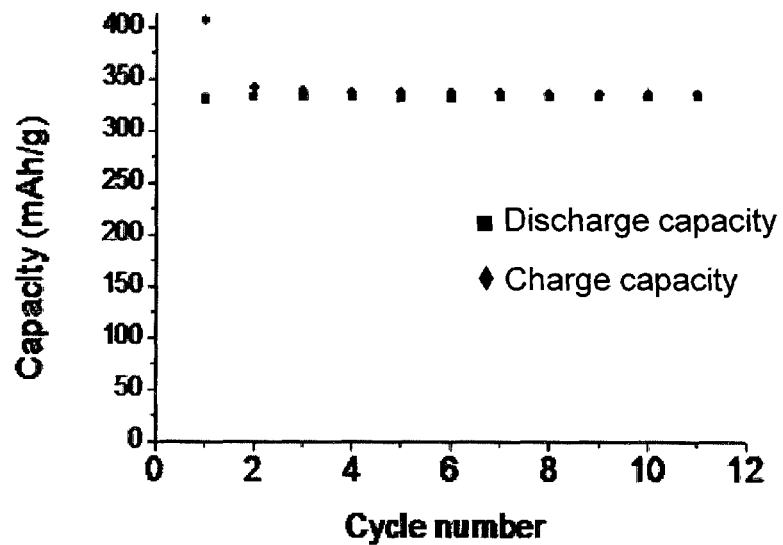
Figure 6D:
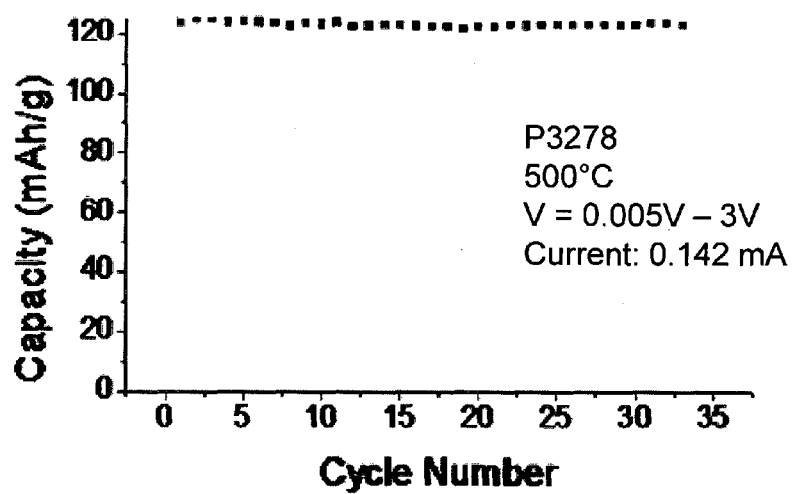

FIG. 6C and FIG. 6D show the capacity vs. cycle number plots for the same, comparing the capacity of the exfoliated graphene produced as disclosed herein (FIG. 6C) with that of commercial (prior art) expanded graphite (FIG. 6D). The results show that the exfoliated graphene formed using the processes disclosed herein has as very stable cycle behavior and has a higher capacity than the prior art commercial samples.

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents. For example, processes described herein can be performed over a wide range of scales subject only to the reasonable physical constraints based on the limits of fluid dynamics, electrical power and container volume.

What is claimed is:

1. A process of forming an expanded hexagonal layered mineral (HLM), comprising: immersing at least a portion of an HLM rock in a slurry constituted by a mixture of expanded HLM rock, a metal salt and an organic solvent, with the slurry having the following composition: HLM rock: 15-20 wt %; HLM flake: 0.1-5 wt %; and an electrolyte of 80-160 g/L of $LiClO_4$ (5-10 wt %) in propylene carbonate: 70-80 wt %;

wherein the HLM rock has atomic interlayers each having an hexagonal lattice structure, with the atomic interlayers separated by interlayer spacings;

electrochemically charging the HLM rock by incorporating the HLM rock into at least one electrode and performing electrolysis through the slurry using the at least one electrode, thereby introducing the organic solvent and ions from the metal salt from the slurry into the interlayer spacings of the HLM rock to form $1^{st}$-stage charged HLM that exfoliates from the HLM rock; and expanding the $1^{st}$-stage charged HLM by applying an expanding force to increase the interlayer spacings between the atomic layers.

2. The process according to claim 1, wherein the HLM is one selected from the group of HLMs comprising: graphite, molybdenum disulfide, tungsten disulfide (diselenide), hexagonal boron nitride, vanadium pentoxide, and vanadium X oxides.

3. The process according to claim 1, wherein the expanding force includes at least one of heat, sonication and pressure.

4. The process according to claim 1, wherein the slurry has a viscosity in the range from 0.05 PaS to 50 PaS.

5. The process according to claim 4, further comprising maintaining the viscosity in the range during the electrochemical charging step by adding expanded HLM to the slurry.

6. The process according to claim 1, further comprising forming the at least one electrode from a metal cage configured to contain the HLM rock.

7. The process according to claim 1, further comprising employing multiple electrodes, each including at least one HLM rock.

8. The process according to claim 1, further comprising conveying the $1^{st}$-stage charged HLM to a storage container.

9. The process according to claim 1, further comprising agitating the slurry during the electrochemical charging step.

10. The process according to claim 1, wherein the ions from the metal salt include lithium ions, and wherein the organic solvent comprises propylene carbonate.

11. A process of forming expanded graphite from graphite rock having atomic interlayers with an interlayer spacing, comprising:

immersing at least a portion of a graphite rock in a slurry constituted by a mixture of expanded graphite, a metal salt and an organic solvent, wherein the slurry has following composition: graphite rock: 15-20 wt %; graphite flake: 0.1-5 wt %; and an electrolyte of 80-160 g/L of $LiClO_4$ (5-10 wt %) in propylene carbonate: 70-80 wt %, and wherein the graphite rock includes atomic interlayers with interlayer spacings;

electrochemically charging the graphite rock by incorporating the graphite rock into at least one electrode and performing electrolysis through the slurry using the at least one electrode, thereby introducing ions from the metal salt from the slurry into the interlayer spacings of the graphite rock to form $1^{st}$-stage charged graphite that exfoliates from the graphite rock; and expanding the $1^{st}$-stage charged graphite by applying an expanding force to increase the interlayer spacings between the atomic layers.

12. The process according to claim 11, wherein the expanding force includes at least one of heat, sonication and pressure.

13. The process according to claim 11, wherein the slurry has a viscosity in the range from 0.05 PaS to 50 PaS.

14. The process according to claim 13, further comprising maintaining the viscosity in the range during the electrochemical charging step by adding expanded graphite to the slurry.

15. The process according to claim 11, further comprising forming the at least one electrode from a metal cage configured to contain the graphite rock.

16. The process according to claim 11, further comprising employing multiple electrodes, each including at least one graphite rock.

17. The process according to claim 11, further comprising conveying the $1^{st}$-stage charged graphite to a storage container.

18. The process according to claim 11, further comprising agitating the slurry during the electrochemical charging step.

19. The process according to claim 11, wherein the ions from the metal salt include lithium ions, and wherein the organic solvent comprises propylene carbonate.

* * * * *